United States Patent
Lee

(10) Patent No.: US 11,240,852 B2
(45) Date of Patent: Feb. 1, 2022

(54) NETWORK APPARATUS FOR DESIGNING COLLISION AVOIDANCE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Chung-Hi Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 81 days.

(21) Appl. No.: 16/204,195

(22) Filed: Nov. 29, 2018

(65) Prior Publication Data

US 2020/0077440 A1 Mar. 5, 2020

(30) Foreign Application Priority Data

Sep. 3, 2018 (KR) .................. 10-2018-0104524

(51) Int. Cl.
*H04W 74/08* (2009.01)
*H04W 72/12* (2009.01)
*H04W 4/46* (2018.01)

(52) U.S. Cl.
CPC .......... *H04W 74/085* (2013.01); *H04W 4/46* (2018.02); *H04W 72/1205* (2013.01); *H04W 72/1289* (2013.01)

(58) Field of Classification Search
CPC ..... A61B 18/1477; A61B 18/18; A61B 18/22; A61B 18/24; A61B 2018/00577; A61B 2018/00589; A61B 2018/00714; A61B 2018/00797; A61B 2018/00815; A61B 2018/00821; A61B 2018/2244; A61B 2018/2261; A61N 2005/0612; A61N 5/0601; H04W 28/16; H04W 4/46; H04W 72/1205; H04W 72/1289; H04W 74/04; H04W 74/085

See application file for complete search history.

(56) References Cited

U.S. PATENT DOCUMENTS

| | | | | |
|---|---|---|---|---|
| 2002/0118641 A1* | 8/2002 | Kobayashi | ........... | H04L 45/125 370/230 |
| 2010/0097952 A1* | 4/2010 | McHenry | ............. | H04W 16/14 370/252 |
| 2010/0261482 A1* | 10/2010 | Guey | .................... | H04B 7/024 455/452.2 |

(Continued)

FOREIGN PATENT DOCUMENTS

| KR | 100747760 B1 | 8/2007 |
|---|---|---|
| KR | 20090030765 A | 3/2009 |

*Primary Examiner* — Kibrom T Hailu
*Assistant Examiner* — Nizam U Ahmed
(74) *Attorney, Agent, or Firm* — McDonnell Boehnen Hulbert & Berghoff LLP

(57) ABSTRACT

Disclosed herein is a network apparatus for designing collision avoidance and a method for controlling the same. The network apparatus for designing collision avoidance includes a plurality of controllers, and a main controller configured to generate a plurality of transmission schedule tables on the basis of transmission data for the plurality of controllers, perform real-time monitoring, and select and change one of the plurality of the transmission schedule tables for collision avoidance.

15 Claims, 7 Drawing Sheets

(56) References Cited

U.S. PATENT DOCUMENTS

| | | | |
|---|---|---|---|
| 2015/0036570 A1* | 2/2015 | Jeong | H04W 52/0216 370/311 |
| 2016/0014805 A1* | 1/2016 | Merlin | H04W 56/0005 370/345 |
| 2016/0294697 A1* | 10/2016 | Varadarajan | H04L 47/28 |
| 2019/0004530 A1* | 1/2019 | Tascione | B60W 30/08 |

* cited by examiner

NETWORK APPARATUS FOR DESIGNING COLLISION AVOIDANCE AND METHOD FOR CONTROLLING THE SAME

CROSS-REFERENCE(S) TO RELATED APPLICATIONS

This application claims priority to Korean Patent Application No. 10-2018-0104524 filed on Sep. 3, 2018, which is incorporated herein by reference in its entirety.

BACKGROUND

Field

Exemplary embodiments of the present disclosure relate to a collision avoidance design technique in a vehicular network, and more particularly, to a network apparatus for designing collision avoidance and a method for controlling the same, which are capable of preventing an increase in bus load in a vehicular network.

Further, the present application relates to a network apparatus for designing collision avoidance and a method for controlling the same, which are capable of maximally preventing superposition of messages for each cycle by assigning an offset time to the message for each controller.

Description of Related Art

As functions of vehicles are improved, many controllers are installed in the vehicles. In other words, the controllers installed in each of the vehicles transmit and receive control factor information, sensor information, and the like, which are required for each system, through communication to allow functions of the system to be performed. At this point, controller information is transmitted in the form of data through a communication system.

As information is increased, the information transmitted to a bus load or the like cannot be accurately transmitted.

Further, when a predetermined certain fast message is added, a system in which a message rate is high and a large amount of transmission data is present exhibits an arithmetic result in which a load exceeds a threshold value. However, there is a problem in that actual data can communicate without any problem for a certain period of time over the threshold value, and thus it is difficult to select the actual data by correct determination.

In order to solve such problems, when a time exceeds the threshold value, there have been proposed techniques in which communication is performed without a delay time by eliminating a delay time using a communication relay controller and the like through jitter and sensitivity analysis and delay time detection using a sensitivity level of communication.

However, these techniques control transmission of a control time in consideration of internal sensitivity to overall messages, but there is a disadvantage in that how select a criterion for securing a signal should be considered in advance.

Further, when an amount of communication data mainly used in a vehicle is increased, there is a problem in that many periodic messages are generated.

SUMMARY

An embodiment of the present disclosure is directed to a network apparatus for designing collision avoidance and a method for controlling the same, which are capable of securing a transmission time without interference between periodic messages.

Another embodiment is directed to a network apparatus for designing collision avoidance and a method for controlling the same, which are capable of securing message transmission without interference by reflecting a secured delay time (offset) at a specific interval of a signal period.

Other objects and advantages of the present disclosure can be understood by the following description and become apparent with reference to the embodiments. Also, it is obvious to those skilled in the art that the objects and advantages of the present disclosure can be realized by the means as claimed and combinations thereof.

In accordance with an embodiment, there is provided a network apparatus for designing collision avoidance, which is capable of securing a transmission time without interference between periodic messages.

The network apparatus for designing collision avoidance includes a plurality of controllers, and a main controller configured to generate a plurality of transmission schedule tables on the basis of transmission data for the plurality of controllers, perform real-time monitoring, and select and change one of the plurality of the transmission schedule tables for collision avoidance.

Each of the transmission schedule tables may be designed to have an offset in consideration of a period and a size of the transmission data.

The offset may be designated for each of the transmission data of the plurality of controllers.

The offset may be sequentially designated from a low period of the transmission data.

The offset may be set so as to not exceed the period.

The offset may be designated to be far away or remote from an already scheduled adjacent frame.

A start offset of the offset may be designated for each of the plurality of controllers.

The transmission schedule table may include transmission interval information indicating a transmission interval, schedule order information indicating an order according to the transmission interval, and scheduling information indicating offset allocation according to the order.

A selection criterion for the selection and change may be an intermediate value not exceeding a predetermined margin in an order of empty schedules.

The selection and change may be performed according to a load measured through the real-time monitoring, a reference value of a bus load allowing transmission of predetermined normal data to be secured, and whether an allowable value of sensitivity capable of ensuring a predetermined transmission time is compared.

In accordance with an embodiment, there is provided a method for controlling a network apparatus for designing collision avoidance, which includes a transmission schedule table generating operation of generating, by a main controller, a plurality of transmission schedule tables on the basis of transmission data for a plurality of controllers, a monitoring performing operation of performing, by the main controller, real-time monitoring, and a selection and change operation of selecting and changing, by the main controller, one of the plurality of transmission schedule tables for collision avoidance according to a result of the real-time monitoring.

BRIEF DESCRIPTION OF THE DRAWINGS

Exemplary aspects are illustrated in the drawings. It is intended that the embodiments and figures disclosed herein are to be considered illustrative rather than restrictive.

DETAILED DESCRIPTION

Figure 1:
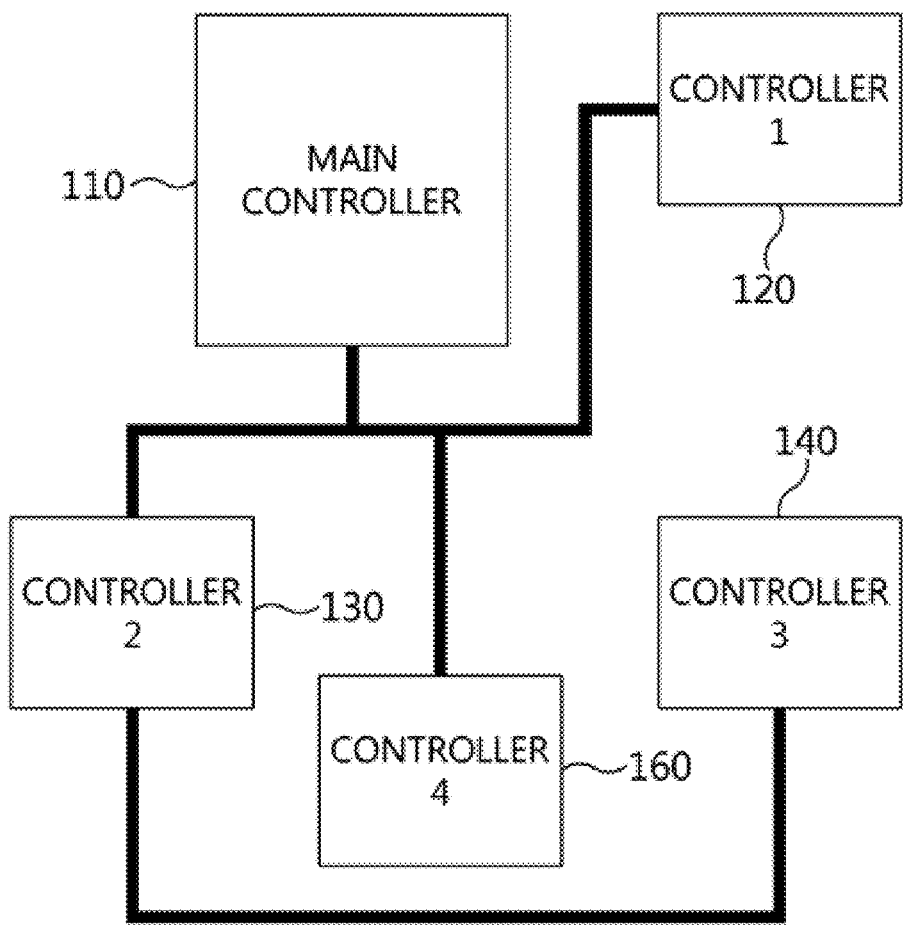
FIG. 1 is a block diagram of a configuration of a network apparatus for designing collision avoidance according to one embodiment of the present disclosure.

The present disclosure may be modified into various forms and may have a variety of embodiments, and, therefore, specific embodiments will be illustrated in the drawings and described in detail. The embodiments, however, are not to be taken in a sense which limits the present invention to the specific embodiments, and should be construed to include modifications, equivalents, or substitutes within the spirit and technical scope of the present disclosure.

In describing each drawing, similar reference numerals are assigned to similar components. Although the terms "first," "second," and the like may be used herein to describe various components, these components should not be limited by these terms. The terms are used only for the purpose of distinguishing one component from another component.

For example, without departing from the scope of the present disclosure, a first component may be referred to as a second component, and similarly, a second component may also be referred to as a first component. The term "and/or" includes a combination of a plurality of related listed items or any item of the plurality of related listed items.

Unless otherwise defined, all terms including technical or scientific terms used herein have the same meaning as commonly understood by those skilled in the art to which the present disclosure pertains.

General terms that are defined in a dictionary shall be construed to have meanings that are consistent in the context of the relevant art, and should not be interpreted as having an idealistic or excessively formalistic meaning unless clearly defined in this disclosure.

Hereinafter, a network apparatus for designing collision avoidance and a method for controlling the same according to one embodiment of the present disclosure will be described in detail with reference to the accompanying drawings.

FIG. 1 is a block diagram of a configuration of a network apparatus for designing collision avoidance according to one embodiment. Referring to FIG. 1, a network apparatus 100 for designing collision avoidance includes first to fourth controllers 120, 130, 140 and 160, and a main controller 110 for changing and applying a transmission schedule table for each of the first to fourth controllers 120, 130, 140 and 160.

The main controller 110 performs functions of generating a plurality of transmission schedule tables on the basis of transmission data for the first to fourth controllers 120, 130, 140 and 160, performing real-time monitoring, and selecting and changing one of the plurality of the transmission schedule tables for collision avoidance.

Examples of the first to fourth controllers 120, 130, 140 and 160 may include, but are not limited to, an air inflow controller for controlling an air inflow device (not shown), an engine controller for controlling an engine (not shown), a cooling fan controller for controlling a cooling fan, an air conditioner controller for controlling an air conditioner (not shown), a motor controller (not shown), and the like. Examples of the air inflow device may include an active air flap (AAF), and an example of the air conditioner may include a full automatic temperature control (FATC). The engine controller may be an engine management system (EMS).

Here, the term "controller" used herein means a unit for processing at least one function or operation, and this unit may be implemented by a combination of hardware and/or software.

The hardware may be implemented with an application specific integrated circuit (ASIC) designed to perform the above-described functions, a digital signal processor (DSP), a programmable logic device (PLD), a field programmable gate array (FPGA), a processor, a controller, a microprocessor, another electronic unit, or a combination thereof. The software may be implemented with a module for performing the above-described functions. The software may be stored in a memory unit and may be executed by a processor. The memory unit or the processor may employ various parts well known to those skilled in the art.

Software implementation may be configured with a module or a unit, and the module or the unit may include a software component, an object-oriented software component, a class component, a task component, a process, a function, an attribute, a procedure, a subroutine, a segment of a program code, a driver, firmware, a microcode, data, a database, a data structure, a table, an array, and a variable.

Figure 2:
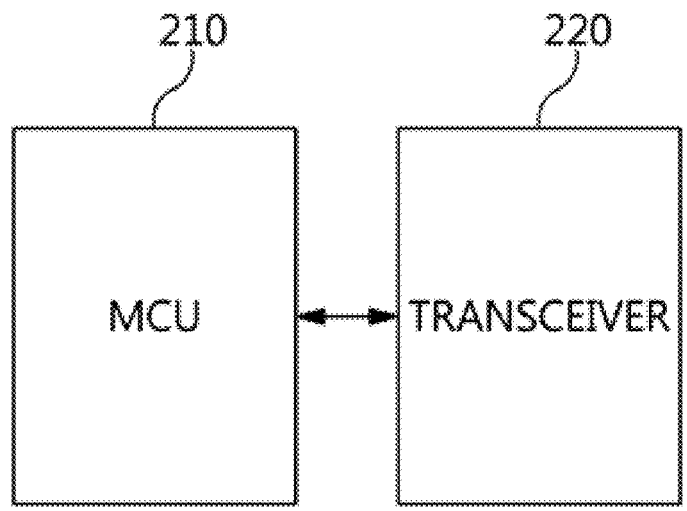
FIG. 2 is a circuit block diagram of controllers shown in FIG. 1.

FIG. 2 is a circuit block diagram of controllers shown in FIG. 1. Referring to FIG. 2, the main controller 110 performs functions of connection and stability between the first to fourth controllers 120, 130, 140 and 160. In other words, the main controller 110 performs function of receiving requests from other controllers 120, 130, 140, and 160 through a logic signal or a controller area network (CAN) signal and supplying outputs for operating necessary functions through a control logic.

To this end, each of the first to fourth controllers 120, 130, 140, and 160 may include a motor control unit (MCU) 210 and a transceiver 220. The MCU 210 may be configured with a microprocessor, a microcomputer, an electronic circuit, or the like. The transceiver 220 is configured with a communication circuit for performing a function of transmitting and receiving signals between the first to fourth controllers 120, 130, 140, and 160.

Accordingly, the main controller 110 communicates with the first to fourth controllers 120, 130, 140, and 160 through the transceiver 220. That is, the transceiver 220 performs a function of inputting and outputting the CAN communication signal. Examples of the CAN communication signal may include a body CAN (BCAN) signal, a chassis CAN (CCAN) signal, a powertrain CAN (PCAN) signal, and the like. Alternatively, in addition to the above-described signals, examples of the CAN communication signal may include a local interconnect network (LIN) signal, a low speed/high speed power line communication (PLC) signal, a control pilot (CP) signal, a ZigBee signal, a Bluetooth signal, a wireless smart utility network (WiSUN) signal, a LoRa signal, a narrowband-Internet of Things (NB-IOT) signal, and the like.

Figure 3:
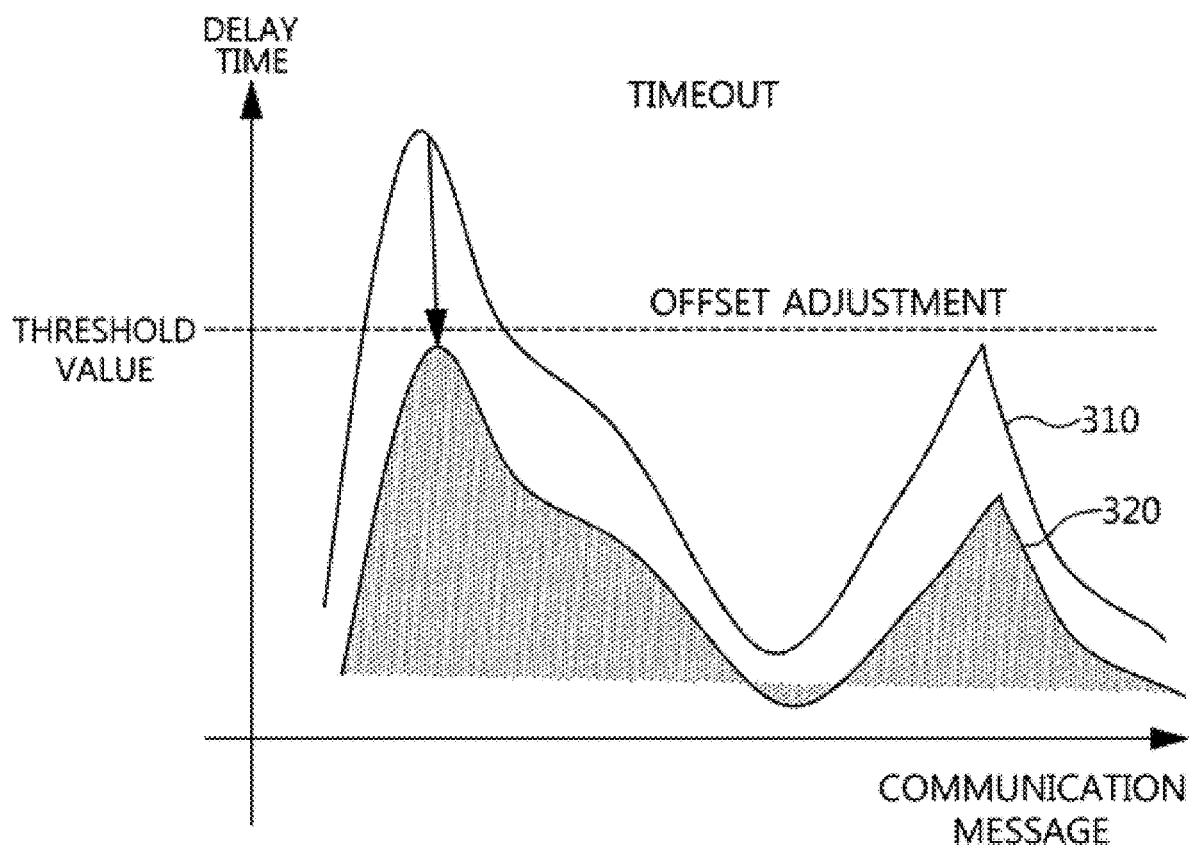
FIG. 3 is a graph showing a concept of offset adjustment according to an embodiment.

FIG. 3 is a graph showing a concept of offset adjustment according to an embodiment. Referring to FIG. 3, a horizontal axis represents variance in communication message with the passage of time, and a vertical axis represents a delay time. When comparing a graph 310 before offset adjustment with a graph 320 after the offset adjustment, it can be seen that a timeout exceeding a threshold value disappeared after the offset adjustment.

Figure 4:
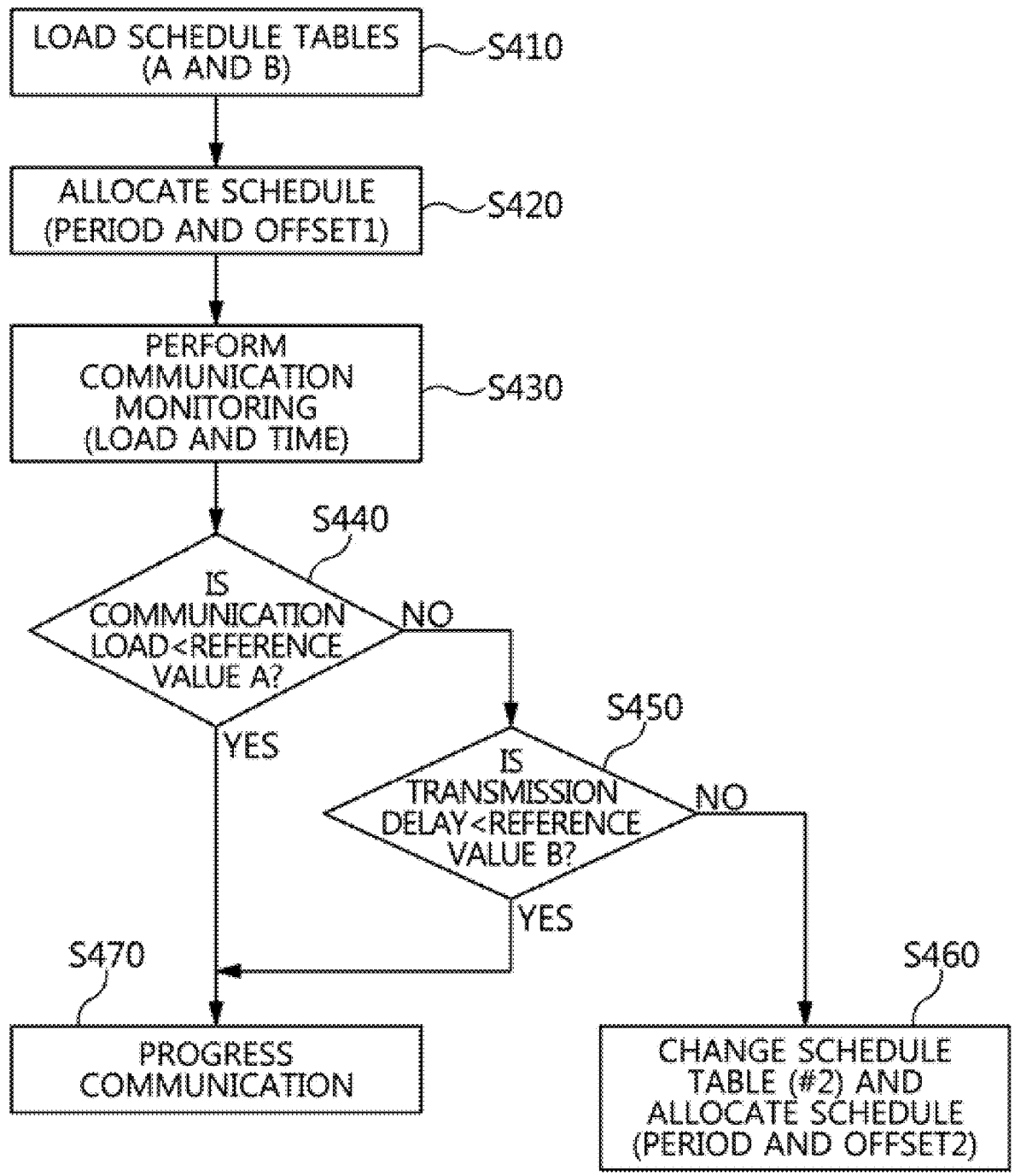
FIG. 4 is a flowchart illustrating a process of adjusting a scheduling so as to secure overall transmission times according to an embodiment.
Figure 5:
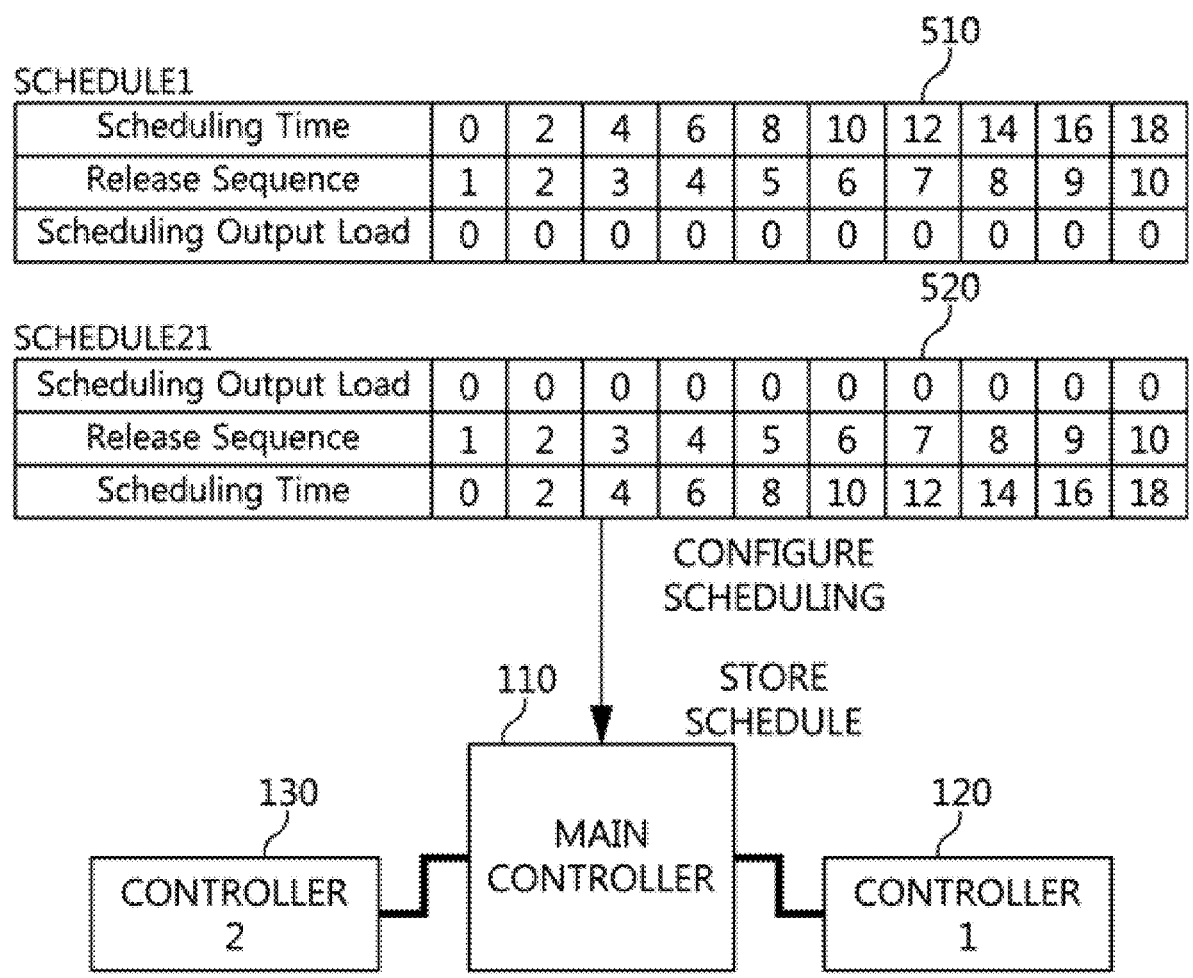
FIG. 5 is a conceptual diagram illustrating an operation of loading a transmission schedule table shown in FIG. 4.

FIG. 4 is a flowchart illustrating a process of adjusting a scheduling so as to secure overall transmission times according to an embodiment. Referring to FIG. 4, the main controller 110 loads a transmission schedule table (S410). In other words, the main controller 110 generates and loads a transmission schedule table on the basis of transmission data for each of the first to fourth controllers 120, 130, 140, and 160. A diagram for describing the foregoing is shown in FIG. 5. FIG. 5 will be described below.

Figure 6:
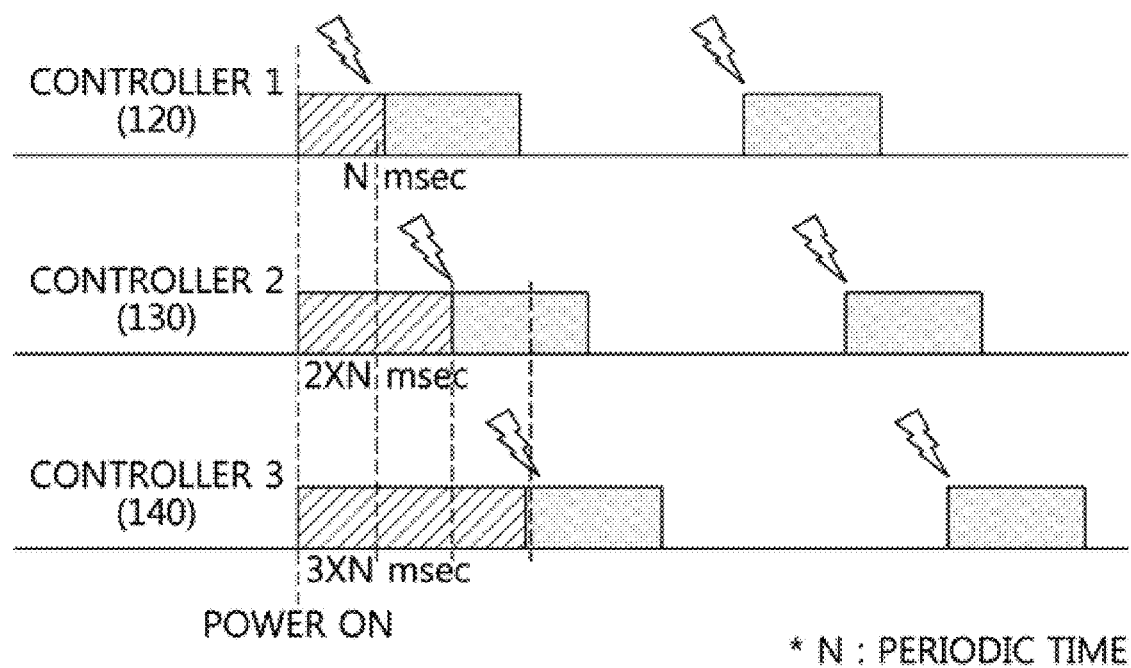
FIG. 6 is a conceptual diagram illustrating an operation of specifying a start offset for each controller according to an embodiment.

Continuing with FIG. 4, after operation S410, schedule allocation is performed (S420). In other words, a period of a start offset is allocated to each of the first to fourth controllers 120, 130, 140, and 160. A diagram for describing the foregoing is shown in FIG. 6. FIG. 6 will be described below.

After operation S420, the main controller 110 performs real-time communication monitoring on the transmission data of the first to fourth controllers 120, 130, 140, and 160 to generate a communication load and transmission delay information (S430, S440).

When the communication load is smaller than a predetermined first reference value A as the determination result of operation S440, current communication progress is maintained (S470).

Otherwise, when the communication load is greater than the predetermined first reference value A as the determination result in operation S440, a transmission delay value is compared with a second reference value B (S450).

When the transmission delay value is smaller than the second reference value B as the determination result in operation S450, the current communication progress is maintained (S470). Otherwise, when the transmission delay value is greater than the second reference value B as the determination result in operation S450, the transmission schedule table is changed and the schedule allocation is performed (S460). For example, a transmission schedule table #1 is changed to a transmission schedule table #2, a period is changed, an offset 2 is applied. Here, the first reference value A is a load reference value of a normal permissible ensured data bus, the second reference value B is a permissible value of sensitivity capable of ensuring a transmission time, an offset 1 has a scheduling interval of 10 ms, and the offset 2 has a scheduling interval of 20 ms.

FIG. 5 is a conceptual diagram illustrating an operation of loading a transmission schedule table shown in FIG. 4. Referring to FIG. 5, an offset for each message of each of the first to fourth controllers 120, 130, 140, and 160 is designed in consideration of a period and a size of transmission data. The transmission schedule table is configured according to such an offset. This becomes a transmission timing basis according to a scheduling. The transmission schedule table includes transmission interval information indicating a transmission interval, schedule order information indicating an order according to the transmission interval, and scheduling information indicating offset allocation according to the order.

The transmission schedule table may be configured with a plurality of schedule tables such as a first schedule table 510 and a second schedule table 520. This is illustrative, and alternatively, more transmission schedule tables may be configured. Such a transmission schedule table is stored in the main controller 110. Alternatively, the transmission schedule table may be stored in a memory (not shown) provided at the MCU 210 of FIG. 2. Alternatively, the memory may be separately configured and the transmission schedule table may be stored in that memory. The memory may include at least one type of storage medium from among a flash type memory, a hard disk type memory, a multimedia card micro type memory, a card type memory (e.g., a secure digital (SD) or extreme digital (XD) memory), a random access memory (RAM), a static random access memory (SRAM), a magnetic memory, a magnetic disk, and an optical disk. Alternatively, the memory may be operated in association with a web storage or a cloud server which performs a storage function on the Internet.

FIG. 6 is a conceptual diagram illustrating an operation of specifying a start offset for each controller according to one embodiment of the present invention. Referring to FIG. 6, the start offset is designated for each of the first controller 120, the second controller 130, and the third controller 140. In other words, after power is turned on, the start offset is designated by a difference of an integral multiple (e.g., 1, 2, and 3).

Figure 7:
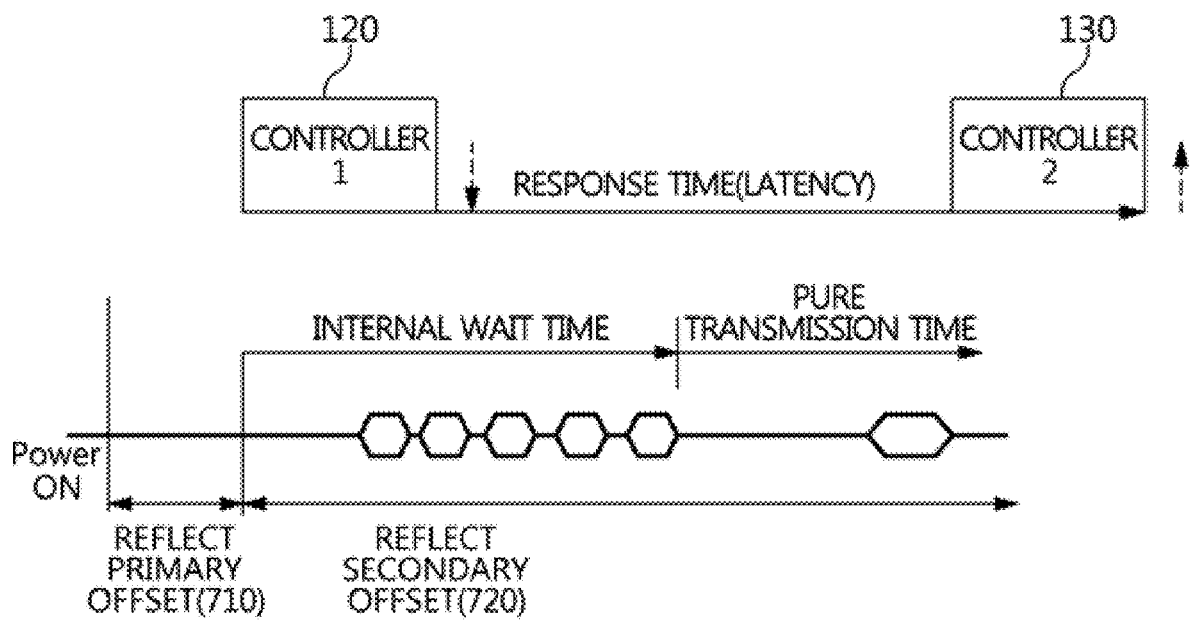
FIG. 7 is an example of transmission offsets during transmission for each controller according to an embodiment.
Figure 8:
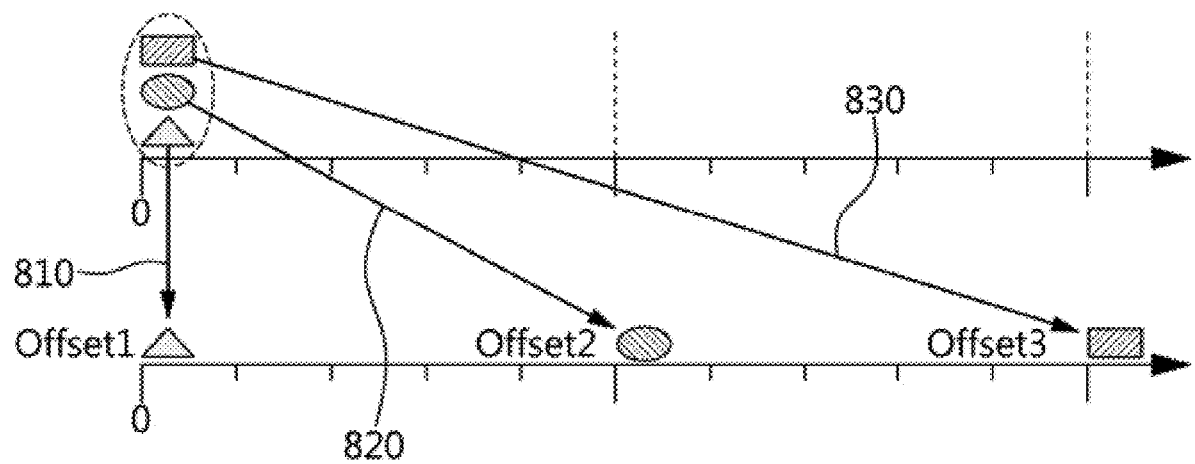
FIG. 8 is another example of transmission offsets during transmission for each controller.

FIGS. 7 and 8 are examples of transmission offsets during transmission for each controller according to embodiments of the present disclosure. Referring to FIG. 7, the communication load is characterized in that each message occupies a communication bus relative to a maximum transmittable data rate.

Further, a communication bus load is proportionally increased as a message period is fast and a size of the transmission data is large. Therefore, a message response time is detected in consideration of a pure transmission time 720 of a signal and an internal wait time 710 due to a priority message. In other words, after the power is turned on, a primary offset is reflected and a secondary offset is reflected after the primary offset is reflected.

Referring to FIG. 8, examples of offsets 810, 820, and 830 are illustrated for each of the first to third controllers 120, 130, and 140. In other words, when transmission for a message of the first controller 120 starts, the offset 1 is "0," and when transmission for a message of the second controller 130 starts, the offset 2 is "period/4," and when transmission for a message of the third controller 140 starts, an offset 3 is "period/2."

That is, optimization of a message delay time reflecting the offset of the message for each of the first to third controllers 120, 130, and 140 is performed, and thus the optimization is performed through a design for maximally avoiding superposition of the same period message transmission start time.

Consequently, the following effects can be obtained.
1) When the transmission start time of the message for individual communication is adjusted, a maximum delay time of a low priority message can be decreased.
2) traffic, which are concentrated at the same time, can be reduced by distributing the transmission start times for the overall messages.

Figure 9:
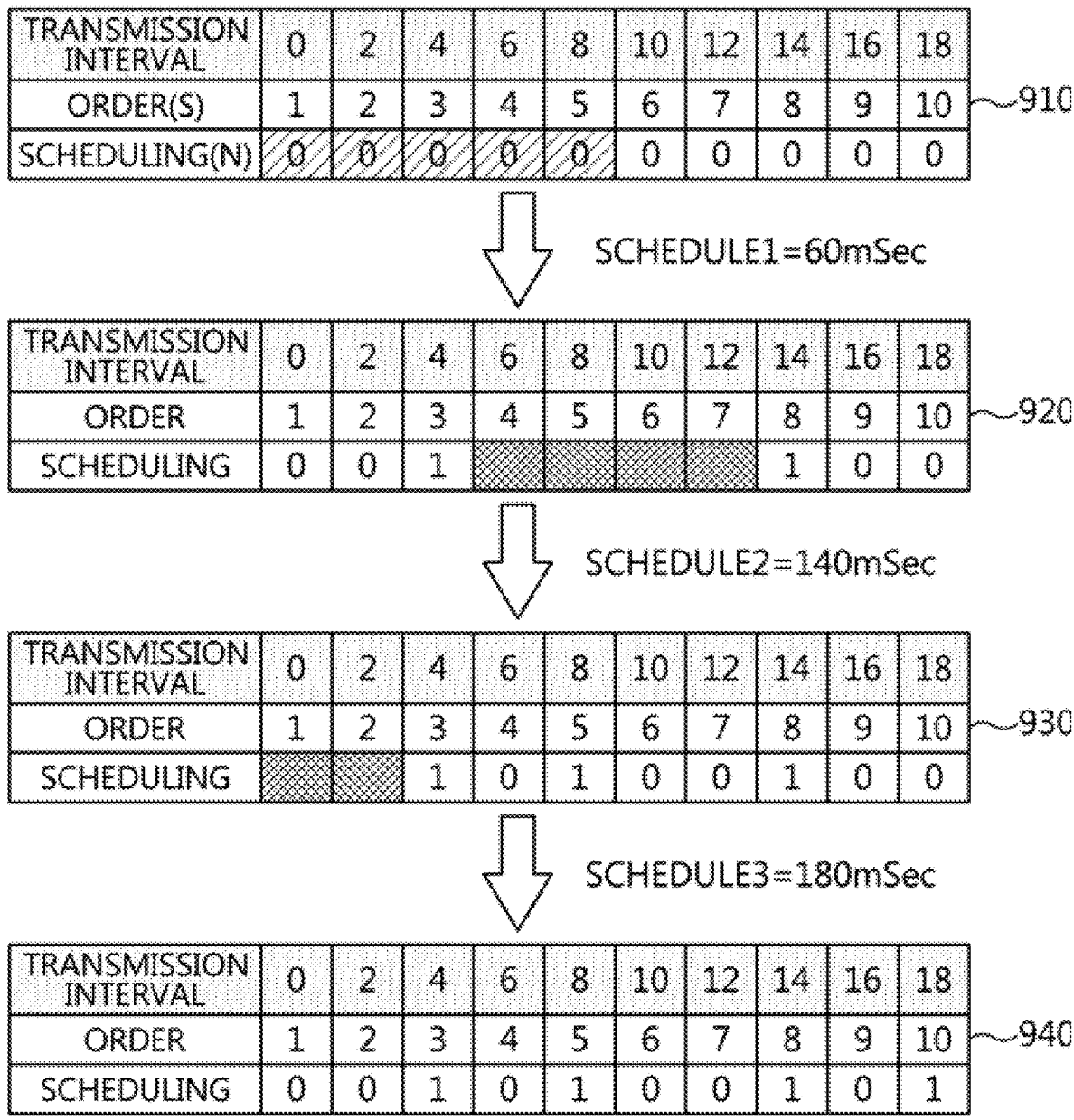
FIG. 9 is a diagram illustrating an example for a change of an offset table according to FIG. 8.

FIG. 9 is a diagram illustrating an example for a change of an offset table according to FIG. 8. Referring to FIG. 9, a first transmission schedule table 910, a second transmission schedule table 920, a third transmission schedule table 930, and a fourth transmission schedule table 940 are illustrated. The main controller 110 cyclically applies the first transmission schedule table 910 to the fourth transmission schedule table 940 according to a communication load monitored for each of the first to fourth controllers 120, 130, 140, and 160.

In other words, in a state in which the first transmission schedule table 910 is already applied, "0" in a row of a scheduling N indicates that transmission is possible and "1" therein indicates that the transmission is impossible. Therefore, slashed portions which are continuously emptied with "0" become scheduling interval positions. Here, N represents a periodic time. That is, N becomes a maximum schedule interval. In other words, a selection criterion takes an intermediate value not exceeding a margin (period/2) of the empty schedule order. As a result of the monitoring, the first transmission schedule table 910 is applied according to the determined scheduling interval.

In this way, the main controller 110 applies the second transmission schedule table 920 to the fourth transmission schedule table 940 according to the communication load monitored for each of the first to fourth controllers 120, 130, 140, and 160.

Meanwhile, the first transmission schedule table 910 has an offset of 60 ms, the second transmission schedule table 920 has an offset of 140 ms, the third transmission schedule table 930 has an offset of 180 ms, and the fourth transmission schedule table 940 is in a state in which there is no offset.

According to the present application, even when a bus load value is out of a reference value, the bus load value falls within a maximum response time range for each message period when compared to a conventional system, it is possible to ensure a response time of an additional signal in addition to the bus load.

Further, as another effect of the present application, it is possible to ensure transmission of a signal within a period by reflecting a portion (a size of a communication buffer according to a period and a size of data) which may occur in an actual controller, adjustment of a transmission time after power is applied, and adjustment of a data transmission period without superposition.

Furthermore, a scheme for a transmission timing of an additional signal in addition to a signal response time (WSET), and thus even in a burst state in which communication signals are concentrated, a signal can be transmitted in a predetermined period such that a freedom of design can be increased.

Moreover, when a controller implemented in a conventional system implements a new function, a bus load or the like occurs when data is increased and thus restrictions occur on implementation of various necessary functions, but according to yet another effect of the present invention, a bus load within a predetermined time can be reduced through adjustment of an offset with respect to a timing of a signal of an actual controller and thus a response can be ensured such that a required control technique can be added and performance of a system can be improved.

In addition, an objective of load management of a network is to secure an accurate response characteristic, and in addition to improvement of sensitivity of jitter and the like, a data transmission start is fundamentally differentiated and a phenomenon in which data is concentrated on a specific section is distributed without variation in total amount of overall communication data such that data can be efficiently exchanged.

Further, the operations of the method or algorithm described in connection with the embodiments disclosed herein may be implemented in the form of a program command which is executable through various computer means and may be recorded in a computer-readable medium. The computer-readable medium may include program (command) codes, data files, data structures, and the like in alone or a combination thereof.

The program (command) codes recorded in the computer-readable medium may be specially designed and configured for the embodiment or may be available to those skilled in the computer software. Examples of the computer-readable recording medium may include magnetic media such as a hard disk, a floppy disk, a magnetic tape, and the like, optical media such as a compact disc read only memory (CD-ROM), a digital versatile disc (DVD), a blu-ray disc, and the like, and semiconductor memory devices, which are specifically configured to store and execute program, a RAM, a flash memory, and the like.

Here, examples of the program (command) codes include machine language codes generated by a compiler, as well as high-level language codes which are executable by a computer using an interpreter or the like. The above-described hardware devices may be configured to operate as one or more software modules so as to perform an operation of the present disclosure, and vice versa.

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

The invention claimed is:

1. A network apparatus for designing collision avoidance, comprising:
   a plurality of controllers; and
   a main controller configured to generate a plurality of transmission schedule tables based on transmission data for the plurality of controllers, perform real-time monitoring for a communication load, and select and change one of the plurality of the transmission schedule tables according to the monitored communication load for collision avoidance;
   wherein each of the transmission schedule tables is configured to have different offsets in consideration of a period and a size of the transmission data; and
   the main controller designates the different offsets to each of the transmission data of the plurality of controllers; and
   wherein the plurality of transmission schedule tables are generated based on the transmission data for each of the plurality of controllers, and the plurality of transmission schedule tables are loaded after being generated, and wherein the schedules of the plurality of transmission schedule tables are adjusted to secure overall transmission times.

2. The network apparatus of claim 1, wherein the different offsets are sequentially designated from a low period of the transmission data.

3. The network apparatus of claim 1, wherein the different offsets are set so as to not exceed the period.

4. The network apparatus of claim 1, wherein the different offsets are designated to be remote from an already scheduled adjacent frame.

5. The network apparatus of claim 1, wherein a start offset of the different offsets are designated for each of the plurality of controllers.

6. The network apparatus of claim 1, wherein the transmission schedule table includes transmission interval information indicating a transmission interval, schedule order information indicating an order according to the transmission interval, and scheduling information indicating offset allocation according to the order.

7. The network apparatus of claim 1, wherein a selection criterion for the selection and change is an intermediate value not exceeding a predetermined margin in an order of empty schedules.

8. The network apparatus of claim 1, wherein the selection and change is performed according to a load measured through the real-time monitoring, a reference value of a bus load allowing transmission of predetermined normal data to be secured, and whether an allowable value of sensitivity capable of ensuring a predetermined transmission time is compared.

9. A method for controlling a network apparatus for designing collision avoidance, the method comprising:
- a transmission schedule table generating operation of generating, by a main controller, a plurality of transmission schedule tables based on transmission data for a plurality of controllers;
- a monitoring performing operation of performing, by the main controller, real-time monitoring for a communication load; and
- a selection and change operation of selecting and changing, by the main controller, one of the plurality of transmission schedule tables for collision avoidance according to the monitored communication load based on a result of the real-time monitoring;

wherein each of the transmission schedule tables is configured to have different offsets in consideration of a period and a size of the transmission data; and the main controller designates the different offsets to each of the transmission data of the plurality of controllers; and wherein the plurality of transmission schedule tables are generated based on the transmission data for each of the plurality of controllers, and the plurality of transmission schedule tables are loaded after being generated, and wherein the schedules of the plurality of transmission schedule tables are adjusted to secure overall transmission times.

10. The method of claim 9, wherein the different offsets are sequentially designated from a low period of the transmission data.

11. The method of claim 9, wherein the different offsets are set so as to not exceed the period.

12. The method of claim 9, wherein the different offsets are designated to be remote from an already scheduled adjacent frame.

13. The method of claim 9, wherein a start offset of the different offsets are designated for each of the plurality of controllers.

14. The method of claim 9, wherein the transmission schedule table includes transmission interval information indicating a transmission interval, schedule order information indicating an order according to the transmission interval, and scheduling information indicating offset allocation according to the order.

15. The method of claim 9, wherein a selection criterion for the selection and change is an intermediate value not exceeding a predetermined margin in an order of empty schedules.

* * * * *